(12) United States Patent
Igarashi

(10) Patent No.: US 6,618,080 B1
(45) Date of Patent: Sep. 9, 2003

(54) AUXILIARY AMPLIFIER SELECTION CIRCUIT FOR A CCD CAMERA

(75) Inventor: Shigeto Igarashi, Tsuruoka (JP)

(73) Assignee: Watec Co., Ltd., Tsuruoka (JP)

(*) Notice: Subject to any disclaimer, the term of this patent is extended or adjusted under 35 U.S.C. 154(b) by 0 days.

(21) Appl. No.: 09/491,581

(22) Filed: Jan. 25, 2000

(30) Foreign Application Priority Data

Feb. 15, 1999 (JP) .......................................... 11-035603

(51) Int. Cl.$^7$ .......................... H04N 5/238; H04N 5/235
(52) U.S. Cl. .................... 348/229.1; 348/364; 348/366
(58) Field of Search ................................ 348/207, 222, 348/223, 224, 229, 230, 254, 255, 362–366, 222.1, 224.1, 229.1, 230.1, 234–237; 396/89, 99, 213, 227, 228, 229

(56) References Cited

U.S. PATENT DOCUMENTS

| | | | | | |
|---|---|---|---|---|---|
| 3,555,181 A | * | 1/1971 | Thommen | ................... | 348/363 |
| 3,777,056 A | | 12/1973 | Pieters | | |
| 4,532,918 A | * | 8/1985 | Wheeler | ..................... | 348/230 |
| 4,587,563 A | * | 5/1986 | Bendell | ....................... | 348/244 |
| 4,780,766 A | * | 10/1988 | Nutting | ................... | 348/229.1 |
| 4,884,140 A | | 11/1989 | Park | | |
| 4,903,136 A | * | 2/1990 | Iketani | .................... | 348/229.1 |
| 5,053,877 A | * | 10/1991 | Kondo | ........................ | 348/364 |
| 5,432,550 A | * | 7/1995 | Kwon | ........................ | 348/255 |
| 5,448,306 A | * | 9/1995 | Koyama | ..................... | 348/679 |
| 5,455,685 A | | 10/1995 | Mori | | |
| 5,539,456 A | * | 7/1996 | Ishii | ........................ | 348/224.1 |
| 5,555,021 A | * | 9/1996 | Igarashi | ..................... | 348/222 |
| 5,610,654 A | | 3/1997 | Parulski et al. | | |
| 5,614,948 A | | 3/1997 | Hannah | | |
| 5,652,925 A | * | 7/1997 | Aoyagi et al. | ................ | 396/96 |
| 5,742,340 A | | 4/1998 | Alves | | |
| 5,751,348 A | * | 5/1998 | Inuiya | ........................ | 348/362 |
| 5,978,024 A | | 11/1999 | Lee | | |

* cited by examiner

Primary Examiner—Ngoc-Yen Vu
(74) Attorney, Agent, or Firm—David O'Reilly

(57) ABSTRACT

Object: To broaden the range of photographing of object, until illumination of 0.02 lux. Construction: In the case of sufficient bright object, photographing is performed by a conventional circuit at a high S/N ratio, at a high degree. In the case of an insufficient bright object, inserting auxiliary amplifying circuit m, $m_1$, $m_2$ or em and ignoring the S/N ratio, and raising the amplification degree. In the case of sufficient bright object, photographing is performed by high S/N ratio, and high degree, in the case of insufficient bright object, an auxiliary amplifying circuit m, $m_1$, $m_2$ or em is inserted ignoring the S/N ratio until utility noise composite of 20 dB (10%).

5 Claims, 5 Drawing Sheets

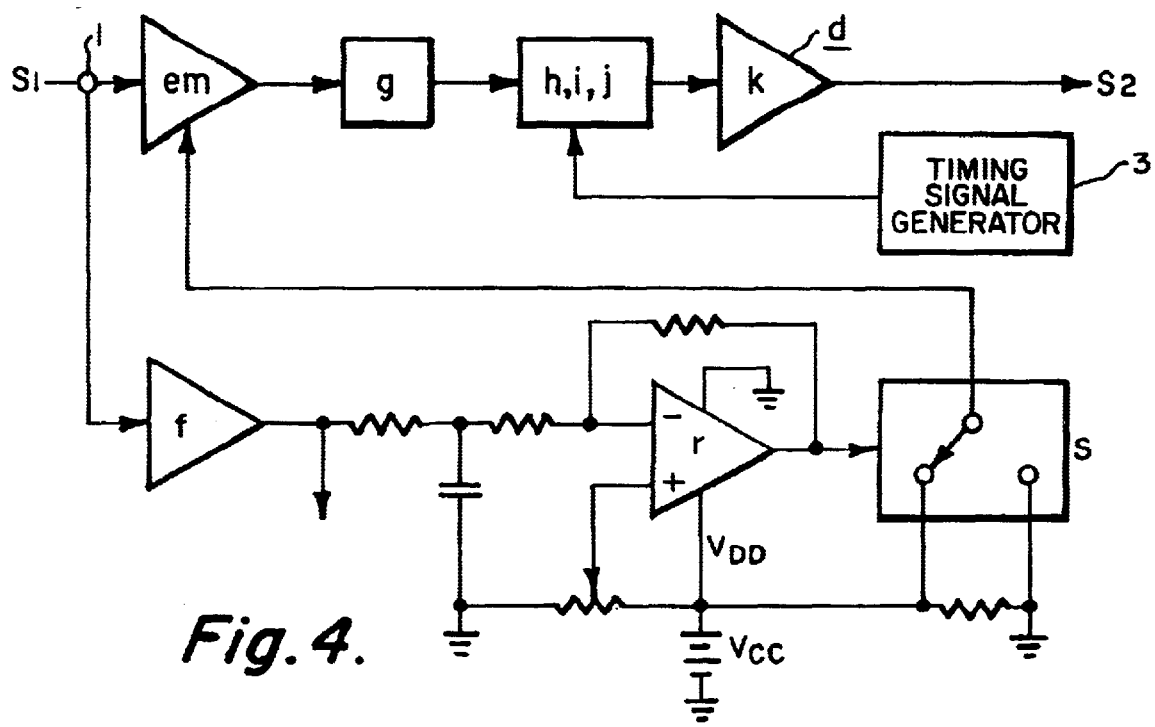
Fig. 4.
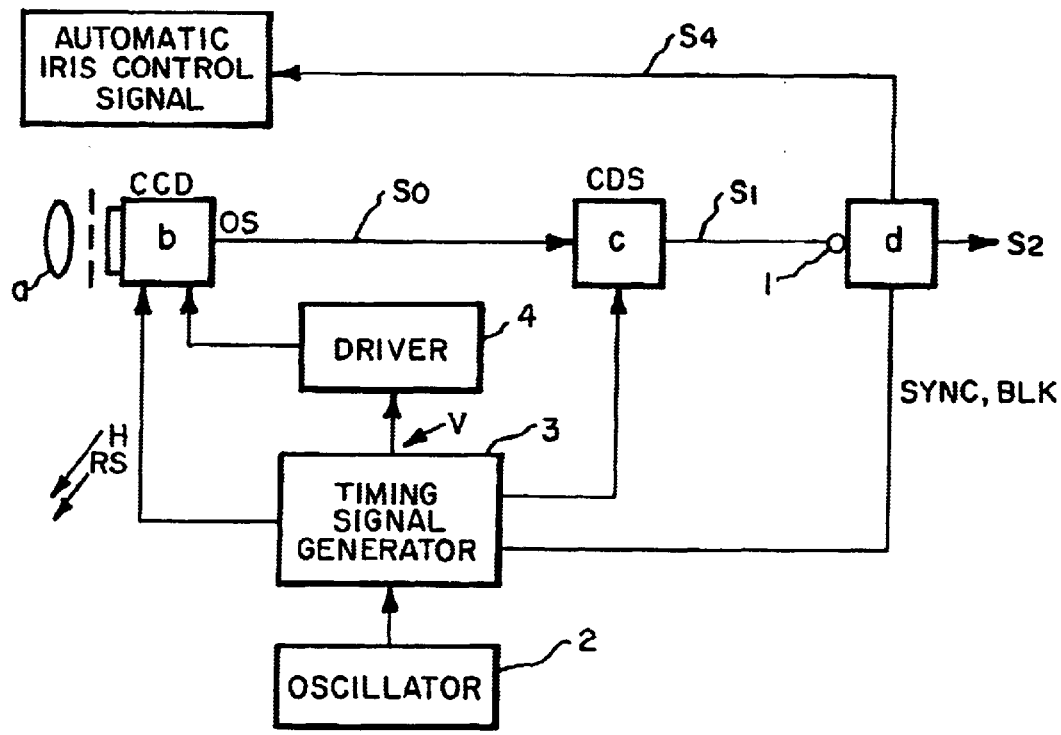
Fig. 5. *(PRIOR ART)*

AUXILIARY AMPLIFIER SELECTION CIRCUIT FOR A CCD CAMERA

BACKGROUND OF THE INVENTION

1. Field of the Invention

This invention relates to a signal amplifying circuit in a CCD (Charge Couple Device) camera using an area image sensor for use in a device such as a monitoring video camera.

2. Background Information

Heretofore, as shown in FIG. 5, in a conventional CCD camera, a light signal passed through lens a is transduced into signal $S_1$, by CCD sensor b. The signal $S_1$ is a sampling held in CDS c as signal $S_1$, the signal $S_1$ is processed in processing circuit d and output from signal input part 1 as signal $S_2$ as shown in FIG. 6.

This invention relates to processing circuit d which is explained in more detail. As shown in FIG. 5, OSC (oscillator) 2 generates a synchronizing signal, timing generator 3 drives a CCD, V driver 4 is an iris signal $S_4$ output from processing circuit d for an automatic iris.

To obtain composite video signal $S_1$, processing circuit d is constructed as shown in FIG. 7. Input signal $S_1$ is amplified to a predetermined level $V_1$ in AGC amplifier e and transduced into constant level signal $S_3$. On the other hand, signal $S_4$ amplified in fixed amplifier f is output as a control signal of a lens having an automatic iris or control signal for inputting a light limiting circuit. Operation of above device is as follows:

Signal $S_3$, AGC, amplified in AGC amplifier e is passed by low pass filter g, to remove a useless wide frequency component, passed through gamma correction circuit h, white clip circuit i, composite sync mixer j, driver k (matching to 75 ohm line) and output as a video output signal $S_2$ shown in FIG. 6. In the composite video output signal, $S_2$, the S/N (signal to noise) ratio is set to more than 40 dB (1%). This invention concerns the S/N ratio.

Problems to be Solved by This Invention.

If an object is illuminated by a sufficient light source of more than 0.02 lux, the S/N ratio is kept more than 40 dB (1%) and no problems occur, but in low illumination such as night, photographing is impossible. However, in night photographing, it is desired to broaden the range of illuminating until 0.02 lux under a wrong S/N ratio.

BRIEF DESCRIPTION OF THE INVENTION

This invention intends to eliminate said drawbacks, and an object of this invention is to provide a signal amplifying circuit in a CCD (Charge Couple Device) camera in which under a sufficient object illuminating conditions (normally more than 0.02 lux), photographing normal circuit construction (FIGS. 5 and 7), while under a low object illuminating condition, photographing while ignoring the S/N ratio, by inserting auxiliary amplifying circuit m or raising the amplification factor of AGC amplifier e.

Namely, in this invention when photographing at normal object illumination, the photograph is at a high S/N ratio and high grade, but when photographing at a low object illumination, the photograph is at high noise and ignoring the utility 20 db S/N.ratio (noise component 10%).

The detection means of said low object illumination is an output level of fixed amplifier f or lowering of the video output level (FIG. 2).

The above and other objects, advantages and novel features of this invention will be more fully understood from the following detailed description and the accompanying drawings, in which like reference numbers indicate like or similar parts throughout wherein:

BRIEF DESCRIPTION OF THE DRAWINGS

FIG. 4 is a block diagram of a third embodiment of this invention.

FIG. 5 is a block diagram of a conventional CCD camera.

DETAILED DESCRIPTION OF THE INVENTION

According to claim 1 of this invention, signal processing circuit d of a video camera using a CCD, area sensor etc. is increased in an auxiliary amplifying circuit m, the amplification degree of the auxiliary amplifying circuit m being raised according to necessity so as to maintain the video output voltage at a predetermined voltage and vary the amplification degree of the processing circuit d so that the range of photographing is broadened.

According to claim 2 of this invention, signal processing circuit d of a video camera using a CCD, area sensor etc. provides an automatic gain control auxiliary amplifying circuit $m_1$ of high S/N ratio, low amplification degree and automatic gain control auxiliary amplifying circuit $m_2$ of low S/N ratio, high amplification degree. According to necessity, it is possible to selectively use automatic gain control auxiliary amplifying circuit $m_1$ of high S/N ratio or automatic gain control auxiliary amplifying circuit $m_2$ of low S/N ratio.

According to claim 3 of this invention, signal processing circuit d of a video camera using a CCD, area sensor etc. the function of said two automatic gain control auxiliary amplifying circuits $m_1$ and $m_2$ in claim 2 are included in one AGC amplifying circuit em which functions are switched by outer switching.

According to claim 4 of this invention, to detect the change of object illumination, the output voltage or the signal level in signal amplifying process is detected.

Embodiments

First Embodiment.

Figure 1:
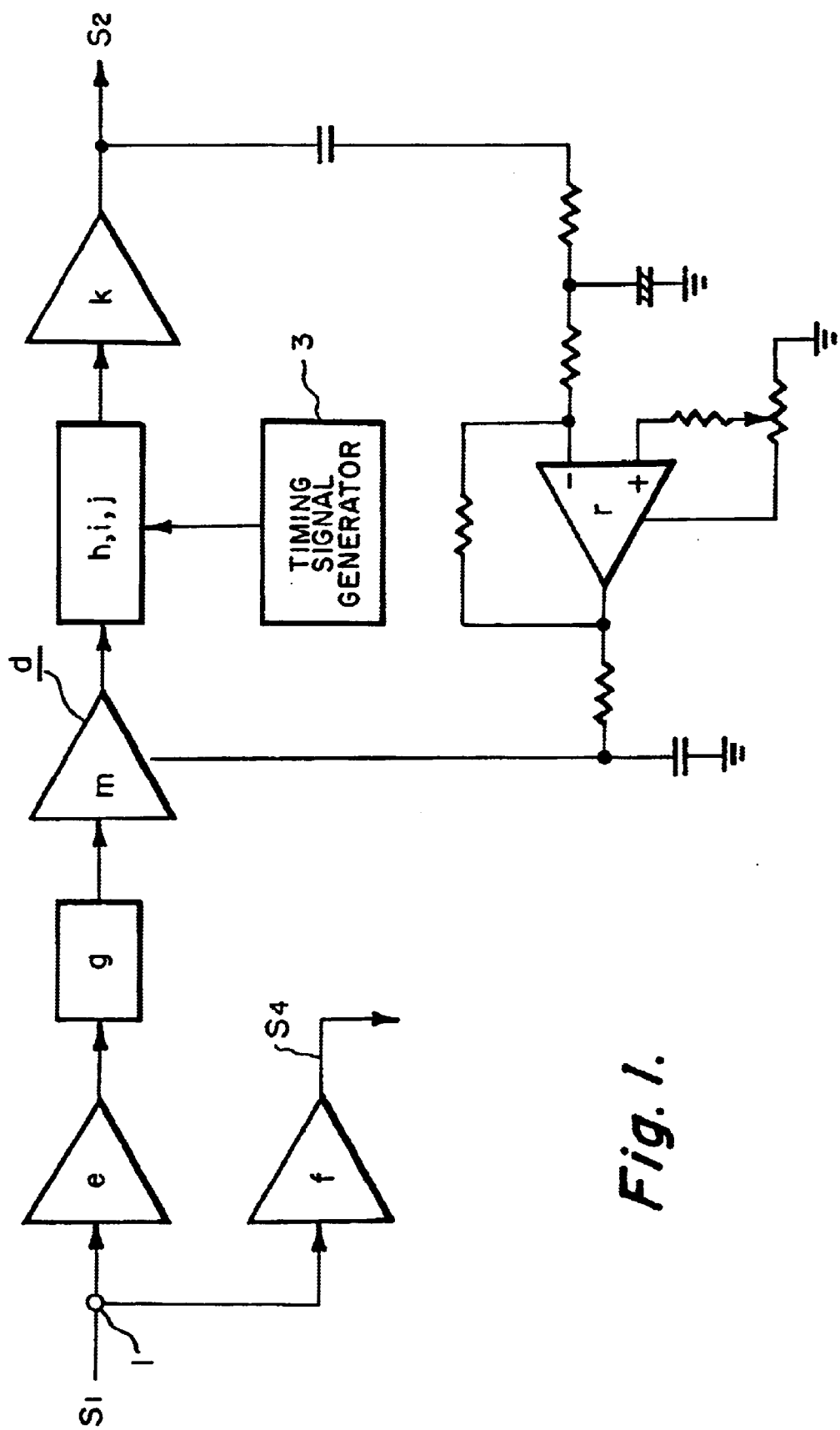
FIG. 1 is a block diagram of a first embodiment of this invention.

FIG. 1 illustrates the first embodiment of this invention.

Figure 7:
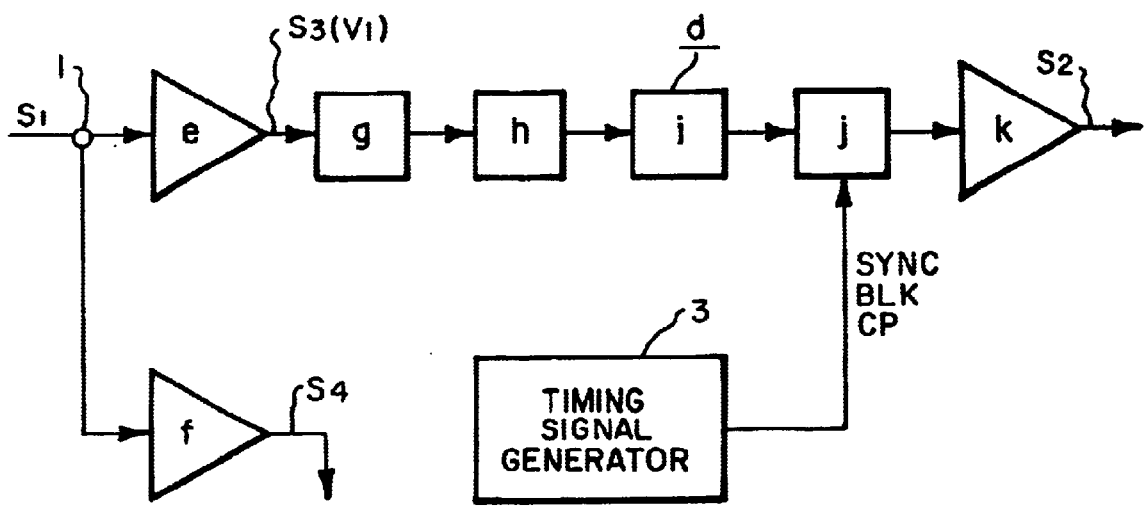
FIG. 7 is a block diagram of the processing circuit d in a conventional CCD camera.

As shown in FIG. 1, in this invention, auxiliary amplifying circuit m is newly inserted between low pass filter g and gamma correction circuit h in a conventional circuit shown in FIGS. 5 and 7 which raises the amplification degree by detecting the variation in the video output voltage (FIG. 2). The amplification degree of the auxiliary amplifying circuit m changes from 0 dB to 20 dB.

Operation of above device is as follows:

In normal photography, the amplification degree is 0 dB.

AGC level detector r monitors video output signal $S_2$ and if the image signal is lower than 0.72 v, the output of level detector r changes and the amplification degree of the auxiliary amplifying circuit m increases.

By said feedback operation, the video output voltage is maintained at a regular voltage of 0.72 v.

In the first embodiment, auxiliary amplifying circuit m is newly inserted between low pass filter g and gamma correction circuit h, but may be inserted between gamma correction circuit h and white clip circuit i, or between AGC amplifier e and low pass filter g, or between signal input part 1 and AGC amplifier e.

Figure 2A:
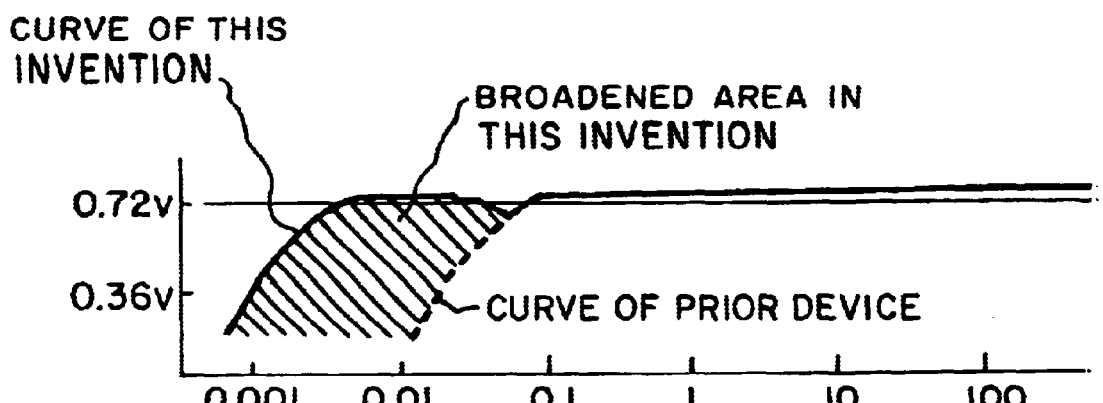
FIG. 2(A) shows the relation of object Lux (abscissa) and video output voltage (ordinate) of a prior device (dotted line) and this invention. (B) shows the relation of object Lux (abscissa) and S/N ratio (ordinate) of this invention. (C) shows the relation of object Lux (abscissa) and gain of auxiliary amplifying circuit m (ordinate) of this invention.
Figure 2B:

The above relationships are shown in the graphs of FIGS. 2(A), (B), (C). FIG. 2(A) shows the relationship of object Lux (abscissa) and video output voltage (ordinate) of the prior device (dotted line) compared with this invention. The hatched lines shows the broadened range for photographs in this invention. FIG. 2(B) shows the relationship of object Lux (abscissa) and S/N ratio (ordinate) of this invention. FIG. 2 (C) shows the relationship of object Lux (abscissa) and gain of auxiliary amplifying circuit m (ordinate) of this invention. In the prior device, as shown in FIG. 2(A), dotted line indicates the prior device, photographing is impossible at object Lux of 0.02 Lux (S/N ratio is 40 dB).

Figure 2C:

In this invention, as shown in FIG. 2(C), the object Lux is lower than 0.02 Lux, the amplification degree increases, and photographing is possible until an object of Lux 0.002 Lux. But the S/N ratio is lowered to 25 dB as shown in FIG. 2(B).

Second Embodiment.

As shown in FIG. 2, in the second embodiment, in signal processing circuit d of video camera using a CCD, area sensor etc. an automatic gain control auxiliary amplifying circuit $m_1$ of high S/N ratio amplification degree 0 dB to 26 dB and an automatic gain control auxiliary amplifying circuit $m_2$ of low S/N ratio amplification degree 0 dB to 46 dB are provided. According to necessity, it is possible to selectively use automatic gain control auxiliary amplifying circuit $m_1$ of high S/N ratio or automatic gain control auxiliary amplifying circuit of low S/N ratio by switch S. $V_{DD}$ is an electric source.

As shown in FIG. 2(C), the object illumination is higher than 0.02 Lux, amplification degree automatic gain control auxiliary amplifying circuit $m_1$ of highf S/N and low amplification degree 0 dB to 26 dB works. For an object illumination lower than 0.02 Lux, high amplification degree automatic gain control auxiliary amplifying circuit $m_2$ works, and the amplification degree increases. However the S/N ratio is lower than 25 dB as shown in FIG. 2(B).

Third Embodiment.

FIG. 4 shows the third embodiment of this invention.

As shown in FIG. 4, in the third embodiment, two automatic gain control auxiliary amplifying circuits $m_1$ $m_2$ are provided in one AGC amplifying circuit em and their amplification degrees are changed by switch S and voltage or current.

Maximum amplification degrees are 0 dB to 26 dB and 0 dB to 46 dB and their amplification degrees are selected by switch S. Level of entering light are detected by level detecting circuit r and controls the switch S and set the amplification degree to a suitable value.

As explained in the construction, the same effects are accomplished.

Effect of This Invention

According to this invention, in the case of sufficiently bright object, photographing is performed by conventional circuit, in the case of insufficient bright object, inserting auxiliary amplifying circuit m, $m_1$, $m_2$ or em, ignoring the S/N ratio, and raising the amplification degree, in the case of a sufficient bright object, photographing is performed by high S/N ratio, and high degree, in the case of insufficient bright object, inserting auxiliary amplifying circuit m, $m_1$, $m_2$ or em, and ignoring S/N ratio, utility photographing is possible.

What is claimed is:

1. In a signal amplifying circuit system for a charge coupled device camera the improvement comprising;

a first automatic gain control auxiliary amplifying circuit ($m_1$) having a low amplification degree and high signal to noise ratio; a second separate automatic gain control auxiliary amplifying circuit ($m_2$) having a high amplification degree and a low signal to noise ratio that is less than about the minimum signal to noise ratio of said auxiliary amplifying circuit with a high signal to noise ratio;

a detector for detecting a change of object illumination; and, a switch activated by said detector for switching from said first automatic gain control auxiliary amplifying circuit ($m_1$) having a low amplification degree and high signal to noise ratio to said second separate automatic gain control auxiliary amplifying circuit ($m_2$) having a high amplification degree and a low signal to noise ratio when said object illumination produces a signal-to-noise ratio that is less than the minimum signal to noise ratio of said first automatic gain control auxiliary amplifying circuit ($m_1$) with said high signal to noise ratio;

whereby said charge coupled device camera is switched to said second separate automatic gain control auxiliary amplifying circuit ($m_2$) having a high amplification degree when ambient illumination of said object is extremely low thereby substantially broadening the range of light levels suitable for photographs by said charged coupled device camera.

2. The signal amplifying circuit system according to claim 1 in which said signal to noise ratio of said second separate automatic gain control auxiliary amplifying circuit ($m_2$) with a high amplification degree and low signal to noise ratio is a minimum signal to noise ratio that is greater than about 20 dB.

3. The signal amplifying circuit system according to claim 2 in which said second separate automatic gain control auxiliary amplifying circuit ($m_2$) having a high signal to noise ratio has a signal to noise ratio that is kept at greater than about 40 dB.

4. The signal amplifying circuit system according to claim 2 in which said detector is constructed to detect and activate said switch at light levels below about 0.02 lux at a signal to noise ratio above about 40 dB.

5. The signal amplifying circuit system according to claim 4 in which the light level for photographs are broadened to low light levels in the range of 0.01 lux to about 0.001 lux.

* * * * *

UNITED STATES PATENT AND TRADEMARK OFFICE
CERTIFICATE OF CORRECTION

| | | |
|---|---|---|
| PATENT NO. | : 6,618,080 B1 | Page 1 of 1 |
| DATED | : September 9, 2003 | |
| INVENTOR(S) | : Shigeto Igarashi | |

It is certified that error appears in the above-identified patent and that said Letters Patent is hereby corrected as shown below:

Column 1,
Line 29, begin new paragraph at "Operation of above device is as follows:";
Line 64, delete "S/N.ratio" and insert -- S/N ratio --.

Figure 3:
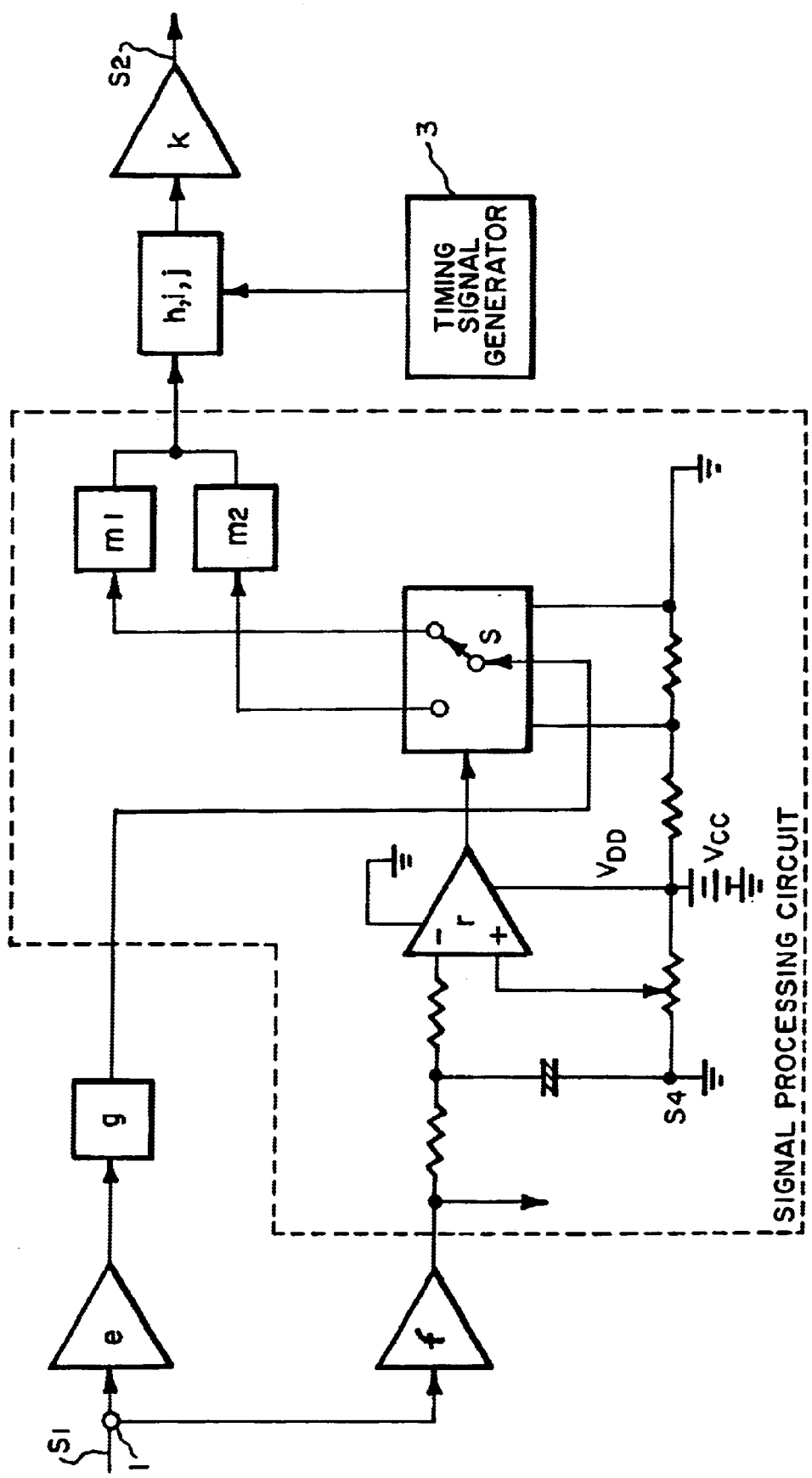
FIG. 3 is a block diagram of a second embodiment of this invention.
Figure 6:
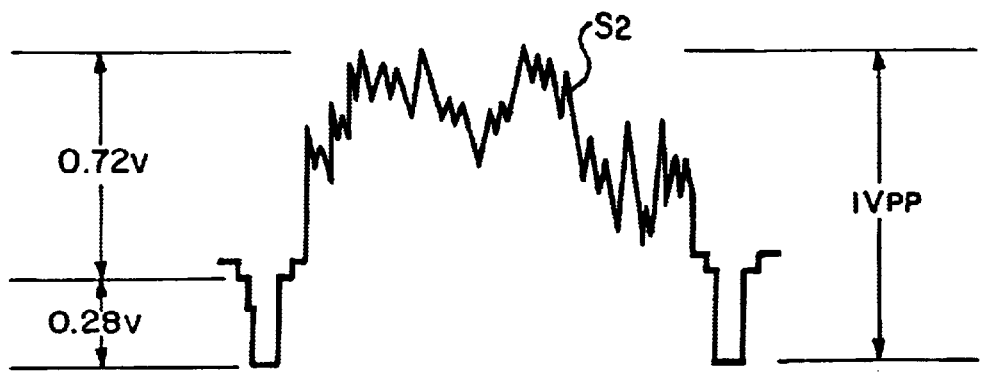
FIG. 6 is a graph of video output signal $S_2$.

Column 3,
Line 32½, after "Second Embodiment." insert new paragraph -- Fig. 3 shows the second embodiment of this invention. --;
Line 42, after "amplifying circuit" insert -- $m_2$ --;
Line 46, delete "highf S/N" and insert -- high S/N --.

Signed and Sealed this

Twenty-seventh Day of July, 2004

JON W. DUDAS
*Acting Director of the United States Patent and Trademark Office*